United States Patent

[11] 3,596,933

| [72] | Inventor | Lawrence F. Luckenbill |
| | | Decatur, Ill. |
| [21] | Appl. No. | 874,351 |
| [22] | Filed | Nov. 5, 1969 |
| [45] | Patented | Aug. 3, 1971 |
| [73] | Assignee | Mueller Co. |
| | | Decatur, Ill. |

[54] JOINT FOR PLASTIC PIPE
21 Claims, 16 Drawing Figs.

[52] U.S. Cl........................................... 285/94,
285/246, 285/249, 285/259, 285/331, 285/348
[51] Int. Cl........................................... F16l 11/04
[50] Field of Search.......................... 285/174,
246, 247, 248, 249, 250, 259, 423, 341, 343, 328,
331, 94, 348

[56] References Cited
UNITED STATES PATENTS

| 2,139,745 | 12/1938 | Goodall.................. | 285/259 X |
| 2,513,115 | 6/1950 | Sprigg................... | 285/249 |
| 3,306,637 | 2/1967 | Press et al............. | 285/249 X |
| 3,008,736 | 11/1961 | Samiron................ | 285/149 |

FOREIGN PATENTS

| 610,455 | 12/1960 | Canada.................. | 285/248 |
| 40,656 | 4/1932 | France................... | 285/331 |
| 1,014,979 | 12/1965 | Great Britain......... | 285/248 |

Primary Examiner—Dave W. Arola
Attorney—Cushman, Darby and Cushman

ABSTRACT: A joint for connecting a nonmetallic flareless plastic pipe or tube to fittings or metal pipes, the joint including two relatively movable members having a variable volume compression chamber therebetween, one of the members fixedly supporting a relatively rigid sleeve element insertable into the plastic pipe to provide a backing therefor. The sleeve element is provided with an annular recess on its exterior discriminately arranged with respect to length, depth and location relative to the compression chamber whereby a noncompressible annular gasket seal made of a deformable elastic material and positioned within the compression chamber will cause the plastic pipe to deform and completely fill the recess in the sleeve element without extrusion or thinning of the walls of the plastic pipe.

INVENTOR
LAWRENCE F. LUCKENBILL
BY Cushman, Darby & Cushman
ATTORNEYS

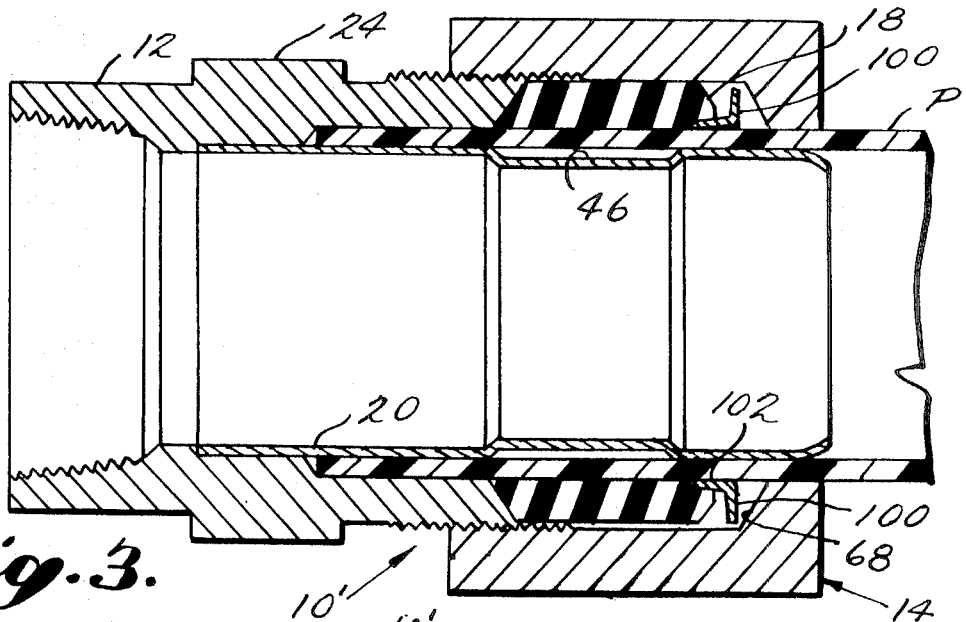
Fig. 3.
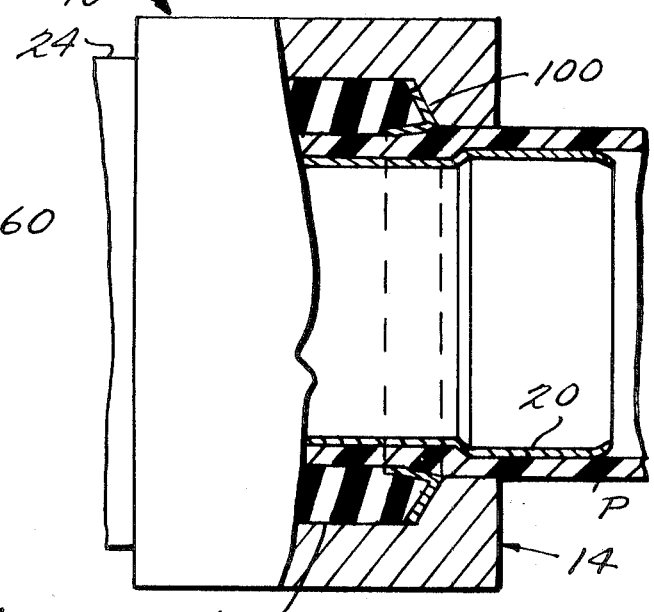
Fig. 4.
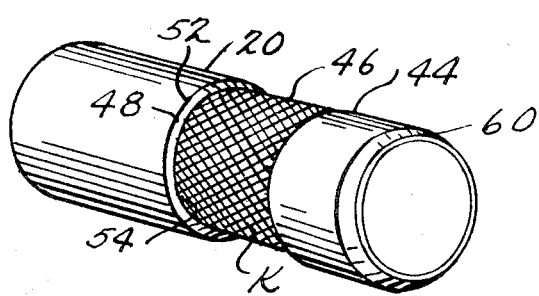
Fig. 6.
Fig. 5.
INVENTOR
LAWRENCE F. LUCKENBILL
BY Cushman, Darby & Cushman
ATTORNEYS

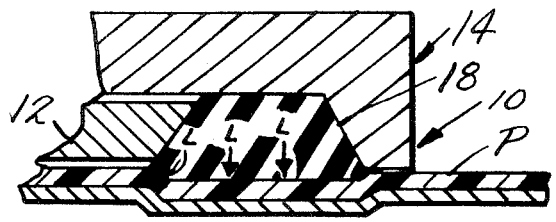
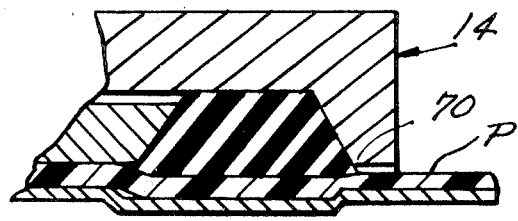
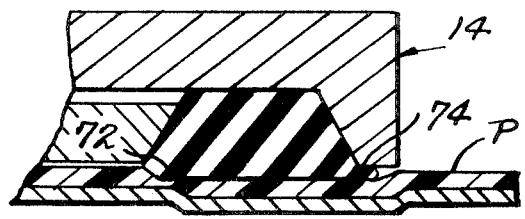
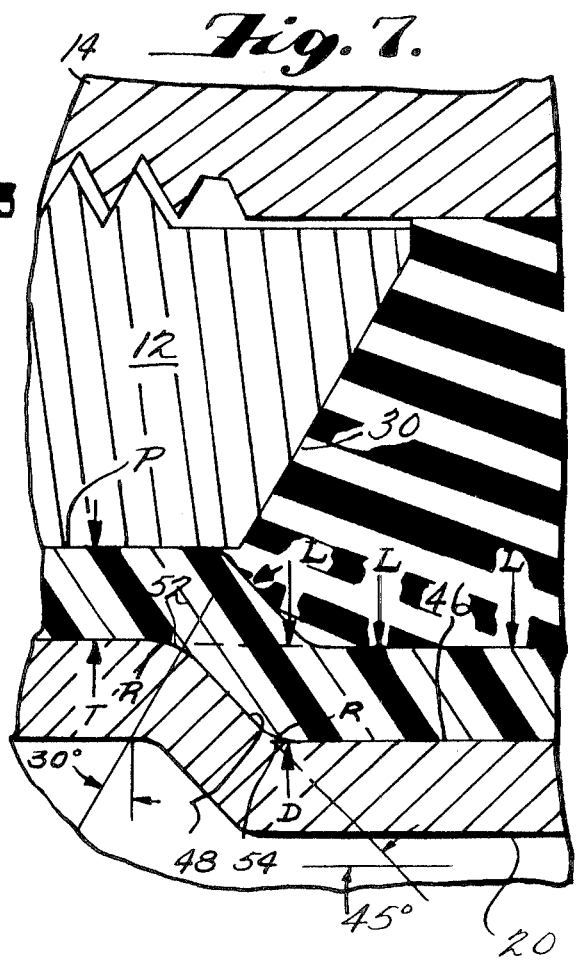
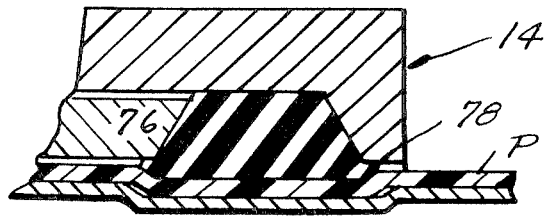
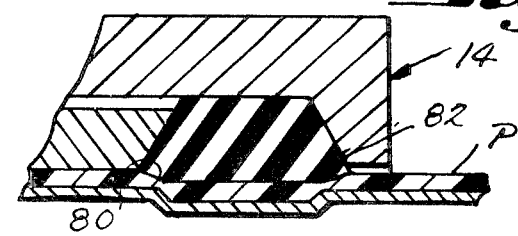
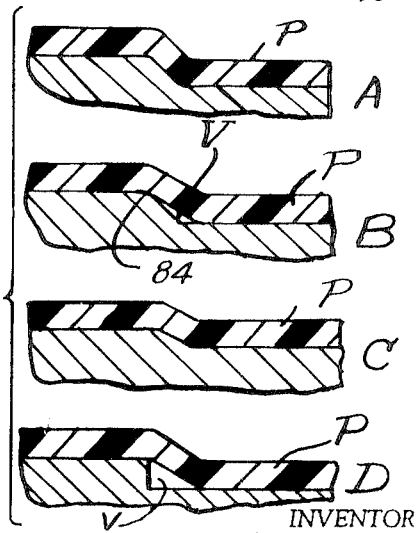

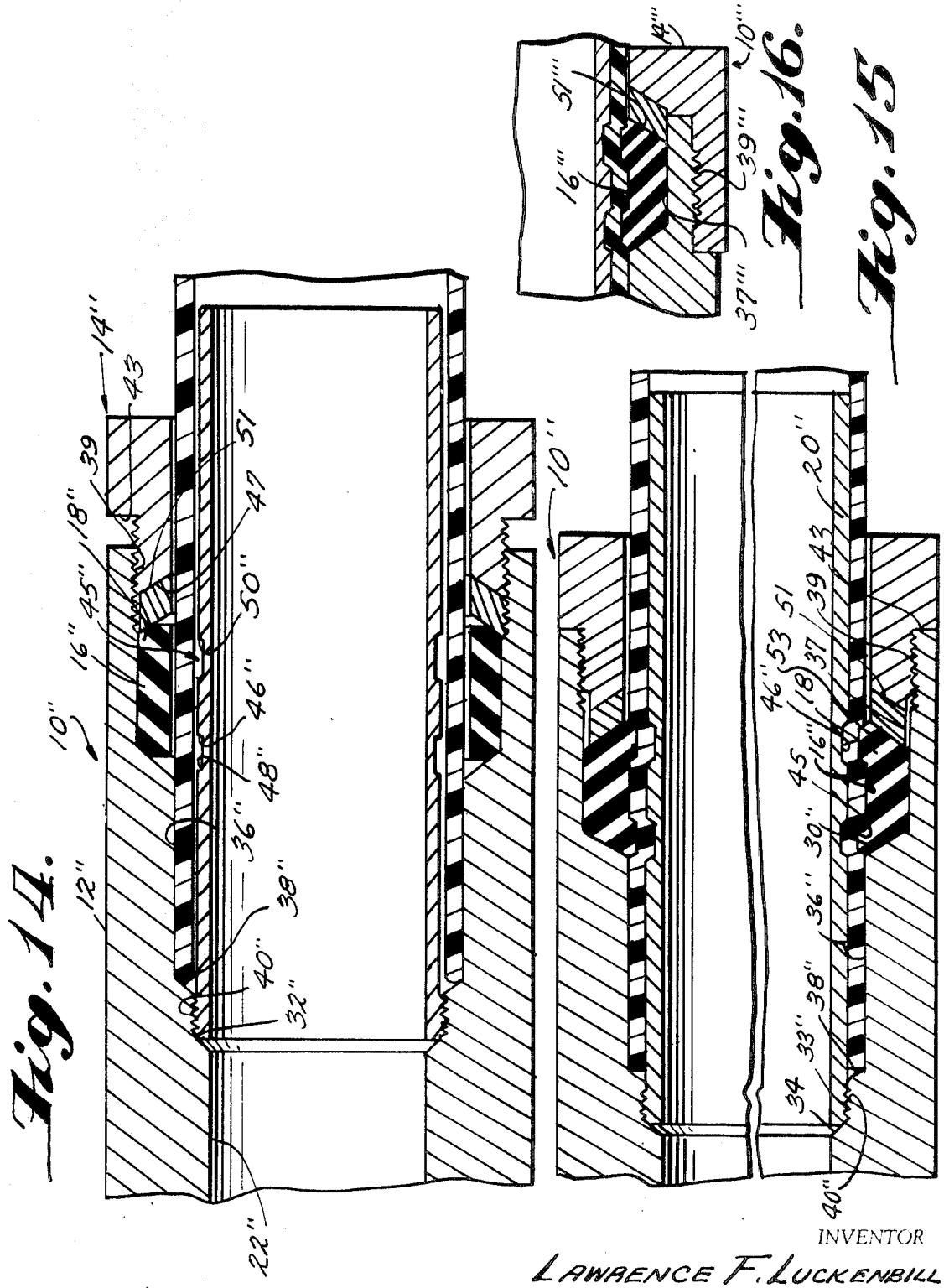

JOINT FOR PLASTIC PIPE

The present invention relates to an improvement in joints for flareless nonmetallic plastic pipes, the joint being such that it has high resistance to pullout, equal to or exceeding the strength of the plastic pipe at normally encountered temperatures whereby failure will occur in the plastic pipe outside of the joint proper. Additionally, the joint of the present invention has a high degree of resistance to leakage throughout a range of pressures and temperatures normal to plastic pipe use with fluid distribution systems such as water distribution or gas distribution.

BACKGROUND OF JOINTS FOR PLASTIC PIPES

In recent years with the development of nonmetallic plastic pipes such as polyvinyl chloride (PVC), polyethylene (PE), polybutylene (PB), and the like, public utilities for the distribution of gas and water, as well as chemical plants and the like, have begun to extensively use the same in their distribution systems. In this respect, the use of nonmetallic plastic pipes results in a considerable saving by eliminating much of the use of iron or copper pipes. Other advantages result from the use of nonmetallic plastic pipe, such as ease of installation in a distribution system and elimination of corrosion problems where corrosive fluids are handled.

Although the use of nonmetallic plastic pipes has increased considerably in recent years, difficulties are still being encountered in providing a fully satisfactory joint between the plastic pipe and a fitting or other pipe, especially a metal pipe. Prior joints have had difficulty in maintaining a high degree of resistance to leakage throughout a range of intended use as well as a high resistance to pullout equal to or exceeding the strength of the plastic pipe itself. In the past, joints have been made for nonmetallic plastic pipes utilizing a sleeve element to give backing to the interior of the plastic pipe and two relatively movable members having a compression chamber therein with an annular gasket seal for applying pressure to the pipe against the sleeve. Such prior joint arrangements, however, when the joint was made up, caused the plastic pipe to have its wall thinned or extruded longitudinally under gasket pressures thus reducing the tensile pullout strength of the joint so that failure occurred in the joint rather than the plastic pipe. Additionally, voids were left between the plastic pipe and the backup sleeve element or liner during makeup of the joint and after a period of use, the cold flow of the plastic pipe into these voids reduced the gasket seal pressure on the plastic pipe, thus causing the reduction of pullout strength of the joint permitting possible failure due to slippage or due to leakage under the intended pressures encountered. Many of the prior joints when made up actually gripped the plastic pipe to an extent where the plastic pipe was notched or cut causing locally higher stresses and weakening of the same at the joint. This would result in ultimate failure due to pullout or leakage. Additionally, the prior joints were so designed one could not be sure on makeup of the joint that it was positively formed to the extent of its maximum design criteria. The skill of the workmen determined the characteristics of the madeup joint.

PRIOR ART

Prior art relating to joints or couplings for nonmetallic plastic pipe are as follows: U.S. Pat. No. 411,829, Oct. 1, 1889, J. F. Nachtrieb; No. 1,334,682, Mar. 23, 1920, L. K. Snell; No. 2,206,672, July 2, 1940, E. G. J. Pederquist; No. 2,467,520, Apr. 19, 1949, W. Brubaker; No. 2,513,115, June 27, 1950, E. A. Sprigg; No. 2,768,845, Oct. 30, 1956, D. Samiran; No. 2,978,262, Apr. 4, 1961, G. E. Franck, and No. 3,008,736, Nov. 14, 1961, D. Samiran, and Canadian Pat. No. 610,455, Dec. 13, 1960, Carl E. Floren, et al.; British Pat. No. 1,014,979, Dec. 31, 1965, J. R. Stephenson Proprietary Limited, and French Pat. No. 1,168,677, Dec. 12, 1958, M. Jacques-Andre Laplanche.

SUMMARY OF THE INVENTION

The present invention relates to a joint for attaching a flareless nonmetallic plastic pipe to a fitting or a metal pipe, the joint utilizing two relatively movable members defining a compression chamber therebetween and having an annular gasket seal made of a noncompressible but deformable material therein, the joint further including a sleeve element fixedly attached to one of the members and insertable into the interior of the plastic pipe as a backup for the same. The sleeve element has an annular recess means comprising one or more annular recesses or grooves on the exterior thereof having a discriminate overall axial length, a uniform depth, and a predetermined location with respect to the compression chamber and the gasket seal when the joint is made up and the volume of the compression chamber has been reduced to a predetermined amount. By such an arrangement, the gasket seal applies a uniform pressure to the exterior of the plastic pipe substantially normal to the wall of the same after deformation of the plastic pipe into the annular recess means, the wall thickness of the plastic pipe not being thinned or extruded and remaining substantially constant throughout the entire annular recess means. This results in a joint for plastic pipe which not only relies on friction between the gasket seal and the pipe material for pullout resistance, but adds to this friction, the friction between the pipe and the sleeve element and the uniform change of shape of the pipe, both of which further resist pullout.

In addition to providing the sleeve element with an annular recess means of a predetermined overall axial length, uniform depth and position or location, at least the extreme oppositely disposed end walls of the recess means are frustoconical and extend at optimum angles to the longitudinal axis of the sleeve element to provide for maximum pullout strength with no thinning or extrusion of the walls of the plastic pipe. The junctures of the end walls defining the overall axial length of the recess means are contoured by making the same with a radius and this, coupled with the slope or angle of the end walls, insures complete filling of the recess with the deformation of the plastic pipe by the gasket seal so that there can be no gradual draining of gasket seal loads by cold flow of the plastic pipe.

The sleeve element or liner for the plastic pipe is manufactured separately from the two relatively movable members defining the compression chamber, although it is subsequently fixedly secured to one of the movable members for no axial or rotational movement relative thereto. By manufacturing the sleeve element separately and then fixedly securing the same to one of the movable members, the annular recess for receiving the end portion of the plastic pipe can be made to a greater axial extent and, consequently, this reduces the possibility of improper makeup of the joint as the plastic pipe does not have to be inserted fully into this recess, but only partially to insure a proper joint from both the standpoint of leakage and pullout strength. Means may be provided in the annular recess or recesses of the sleeve element to prevent the plastic pipe rotating relative to the sleeve element during makeup of the joint. Additionally, at least one of the two relatively movable members defining the compression chamber may be interiorly coated with a low friction dry film lubricant to reduce the torque during makeup of the joint and to reduce the tendency to frictionally distort the gasket seal during makeup of the joint. Suitable dry film lubricants for reducing friction on the parts of the joint may be Teflon, or molybdenum disulfide ($MOS_2$) in a binder such as an epoxy, an alkyd resin paint or the like.

An object of the present invention is to provide an improved joint for connecting a nonmetallic flareless plastic pipe or tube to fittings or other pipes, the joint being capable of installation in the field by workmen without any requirement for unusual or special technical knowledge.

Another object of the present invention is to provide an improved joint for nonmetallic flareless plastic pipe which positively grips the plastic pipe by deformation of the same without thinning of wall size or extrusion of the plastic pipe, thereby resulting in a joint having high pullout strength which is equal to or exceeds the strength of the pipe per se and a joint that has a high resistance of leakage throughout a range of pressures and temperatures normal to the plastic pipe use.

Ancillary to the preceding object, it is a further object of the present invention to provide an improved joint for plastic pipe which will maintain its pullout strength and resistance to leakage over the entire life of the joint.

A still further object of the present invention is to provide an improved joint for nonmetallic plastic pipe which is simple and inexpensive to manufacture, and which may be easily and quickly made up in the field for use in fluid lines for the distribution of fluids such as gas, water, and certain flowable chemical products.

These and other objects and advantages of the invention will appear more fully from the following specification, claims and drawings.

DESCRIPTION OF THE DRAWINGS

FIG. 3 is a vertical sectional view of a modified form of joint of the present invention about to be made up, this joint compensating for a wider range of outside diameters of the plastic pipe;

FIG. 4 is a fragmentary view partly in elevation and partly in section of the joint of FIG. 3 illustrating the same completely made up;

FIG. 5 is a perspective view of one form of sleeve element or liner utilized with the joints of FIGS. 1 or 3;

FIG. 6 is a perspective view of another form of sleeve element or liner utilized with the joints of FIGS. 1 and 3;

FIG. 7 is an enlarged fragmentary sectional view illustrating the critical features of the joints of FIG. 1 or FIG. 3;

FIG. 8 is a fragmentary view on a reduced scale to that of FIG. 7 illustrating the joint of the present invention made up to show the relationship between length, depth, and location of the recess of the sleeve element with that of the compression chamber and gasket seal;

FIGS. 9 through 12 inclusive represent improper arrangements with respect to joints similar to the joint of the present invention but not provided with the critical features relative to axial length, depth and position of the recess in the liner, as compared to the compression chamber and the gasket seal; and FIGS. 13A to 13D inclusive represent fragmentary partial sections of the sleeve element or liner and plastic pipe and illustrating proper and improper assembled conditions.

FIG. 14 is a vertical sectional view of a further modified form of the joint of the present invention about to be made up, the joint utilizing a gland nut principle for the follower means;

FIG. 15 illustrates the joint of FIG. 14 after being made up; and

FIG. 16 is a vertical sectional view of a still further modification of the joint of the present invention, the joint being illustrated as fully made up.

DETAILED DESCRIPTION OF THE INVENTION

Figure 1:
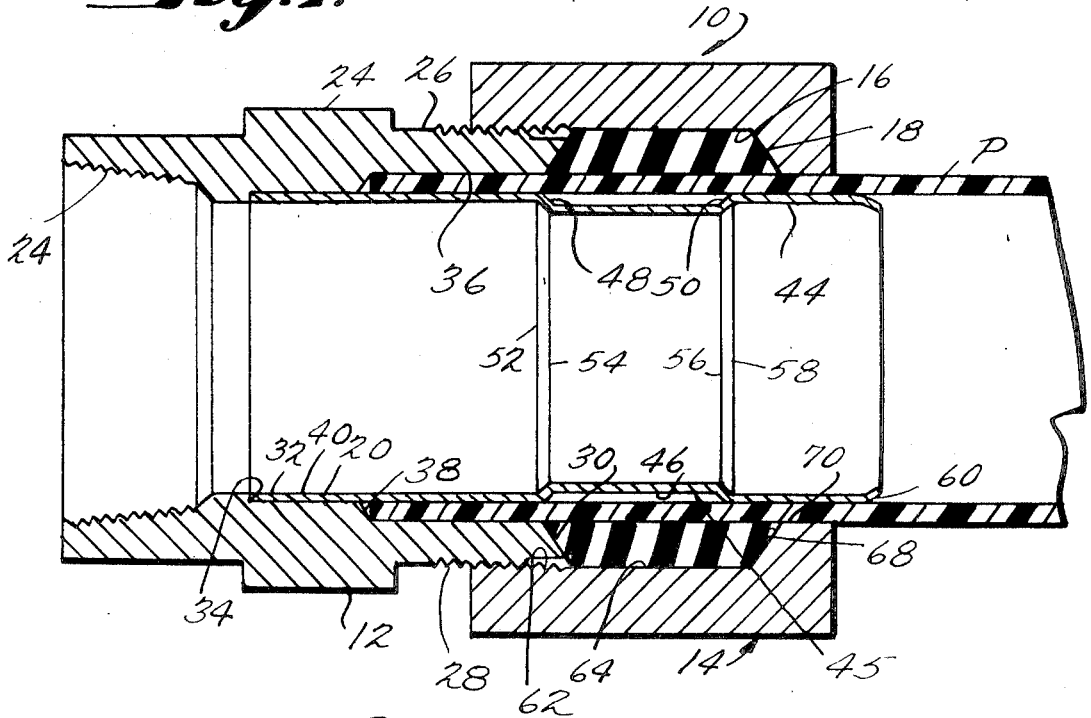
FIG. 1 is a vertical sectional view through a joint of the present invention, the view illustrating the arrangement of the various parts of the joint prior to complete makeup of the joint.
Figure 2:
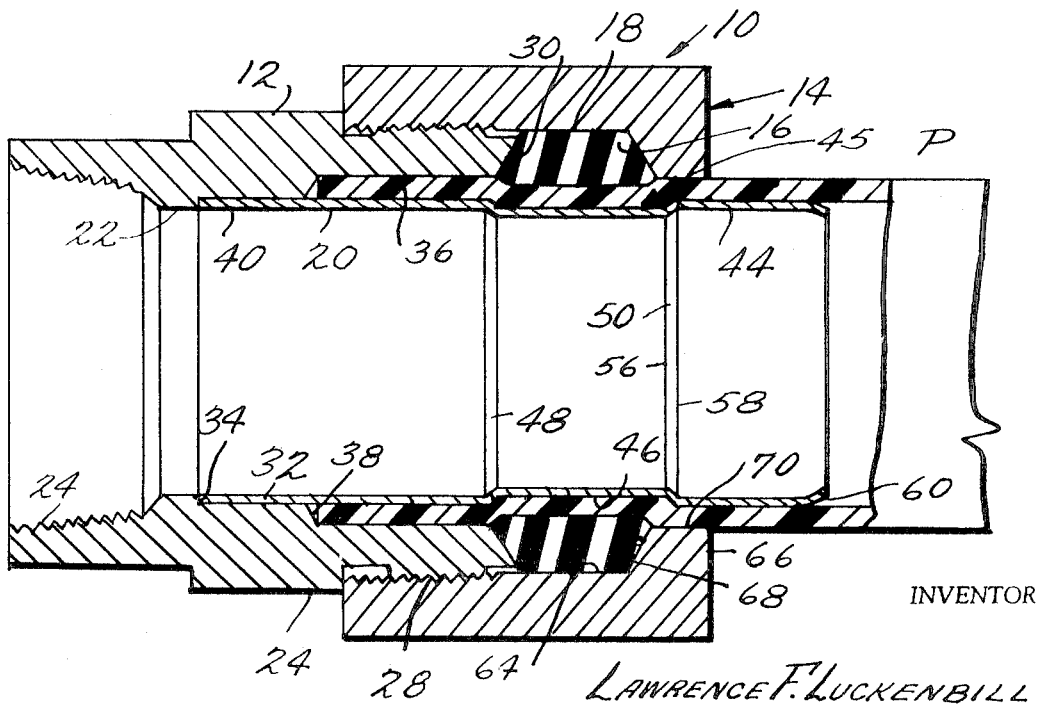
FIG. 2 is a vertical sectional view of the joint of FIG. 1 and illustrating this joint completely made up.

Referring now to the drawings wherein like character or reference numerals represent like or similar parts, there is disclosed in FIGS. 1 and 2 a joint of the present invention, generally designated at 10, for attaching a nonmetallic flareless plastic pipe P to a fitting or another pipe, usually a metal pipe. The joint 10 broadly includes two relatively movable members, namely a body member or fitting 12 and follower means or member 14. The members 12 and 14 define a variable volume compression chamber 16 therebetween which has an annular gasket seal 18 therein. The joint 10 further includes a sleeve element 20 fixedly secured to the member 12 and providing a backup liner for the plastic pipe P to prevent collapse of the same as well as a means of axially securing the same. For the purpose of this description, the member 12 will be referred to as a hollow body member, it being understood that this term as used in the specification and claims is intended to cover a fitting forming part of a valve body or valve stop, or a fitting for connecting another pipe directly thereto, or a fitting for a tank or the like.

The nonmetallic plastic pipe P may be made from either a hard or soft plastic material, so long as it can deform in the makeup of the joint. Typical plastics used today for such pipe are polyethylene (PE), polyvinyl chloride (PVC), polybutylene (PB), and the like.

The fitting or hollow body member 12 of the joint 10 is best illustrated in FIGS. 1, 2 and 7. In more detail, the hollow body member 12 is provided with a bore 22 therethrough for the flow of fluid. At one end of the hollow body member 12, it may be provided with interior threads 24 for the reception of an end of a pipe or another fitting, as is well known in the art. The exterior of the body member 12 is provided with a shoulder 24 which may be hexagonal or noncircular in configuration for the reception of a wrench, or may be a plain diameter if desired. Shoulder 24 provides a positive stop upon which the end of the member 14 may bottom, as shown in FIG. 2. An end portion 26 opposite to the end having the interior threads 22 is exteriorly threaded, as indicated at 28, for reception of interior threads 62 in the follower means 14, when such means 14 is a ring-type follower nut. The terminal end of the end portion 26 is provided with an outwardly facing and outwardly flaring frustoconical shoulder 30, which will be discussed in more detail later in the specification. A counterbore 32 terminating at its inner end in an annular shoulder 34, which surrounds the bore 22, is provided for fixedly receiving an end portion 40 of the elongated sleeve element 20. A second counterbore 36 of a diameter greater than the counterbore 32 and substantially equal to the outside diameter of the plastic pipe P extends inwardly from the frustoconical shoulder 30 for a considerable axial extent, the second counterbore 36 terminating at its inner end in an annular shoulder 38 surrounding the end of the counterbore 32.

Plastic pipe P comes in standard sizes, determined by the particular outside diameter of the same, but the wall thickness for a particular size (outside diameter) of such plastic pipe may vary, depending on the material from which the pipe is made and other factors. Since the outside diameter for a particular size of plastic pipe is constant, the counterbore 36 of the body member 12 has a diameter substantially equal to the same. To make this body member 12 capable of accommodating for variance in the wall thickness, the sleeve element or liner 20 to be fixedly attached in the counterbore 32 is selected from one having an exterior diameter at least on the portion received within the interior of the pipe P, substantially equal to the interior diameter of the pipe on which it is to be used.

The space between the exterior of the sleeve element 20 and the surface of the second counterbore 36 define an annular chamber of substantial axial extent for receiving the end portion of the plastic pipe P when the joint 10 being made up. By having the end portion of the plastic pipe P fit into an annular chamber or space of considerable axial extent, it eliminates error in making up of the joint as the workman does not necessarily have to bottom the end of the plastic pipe P against the shoulder 38 so long as he has positioned at least a portion of the end portion of the plastic pipe P in this annular space.

Referring next to FIGS. 1, 2, 5, 6 and 7, it will be noted that the rigid sleeve element or liner 20 has its end portion 40 fixedly secured within the first counterbore 32 against both axial and rotary movement relative to the hollow body member 12. In some instances the sleeve element 20 is fixedly secured by a press or force fit in the counterbore 32, so that it becomes permanently affixed to the body member 12. However, it may be provided on its end portion with threads 42, as shown in FIG. 6, with the counterbore 32 being provided with complementary threads, the sleeve element 20' being threadedly retained in position. Additionally, the sleeve element 20 could be soldered or welded into position in the first counterbore 32. By making the sleeve element 20 separate from the body member 12, rather than integral with the same, the annular chamber or space between the second counterbore 36 and the sleeve element may be made of a greater axial extent than if the sleeve element is an integral part of the body member 12, thus resulting in the advantage of makeup or assembly of the joint as mentioned above. Additionally, another advantage of making the sleeve element 20 separate from, rather than integral with, the body member 12 is that the proper size sleeve element may be selected to accommodate for wall thickness of a particular size of plastic pipe P without the expense of providing different body members for different wall thicknesses.

Rigid sleeve element 20 is preferably made of metal, the metal utilized being compatible for the intended use of the joint 10. For example, plain carbon steel could be used for a joint used in a gas distribution system, whereas stainless steel could be used in a joint for a water distribution system or a system of distributing certain chemicals which will not corrode the stainless steel.

Sleeve element 20 has its other end portion 44 projecting well beyond the frustoconical shoulder 30 of body member 12, as well as beyond the follower nut 14 when the joint 10 is made up, as shown in FIG. 2. On the exterior of the end portion 44, which projects beyond the frustoconical shoulder 30, there is provided annular recess means 45 comprising at least one annular recess 46, the recess means being of substantial axial extent and of a uniform depth D (FIG. 7). Preferably, the depth D of the recess 46 is in the order of one thirty-second of an inch, but this may vary slightly, depending on the wall thickness and softness of the plastic pipe P. For plastic material currently in use in pipes, the aforementioned one thirty-second of an inch depth has been found satisfactory over wide range of sizes of pipe.

The annular recess 46 of the sleeve element or liner 20 terminates in an inner frustoconical end wall 48 and an outer frustoconical end wall 50. As best shown in FIG. 7, the frustoconical end wall 48 is provided with an outer juncture 53 and an inner juncture 54, both of which are contoured with a radius as indicated at R which will be discussed later in the specification. The frustoconical end wall 50 is provided with an inner juncture 56 and an outer juncture 58, which likewise are contoured each by a radius. Referring back to FIG. 7, it will be noted that the outer juncture 52 of the inner end wall 48 of the annular recess 46 in sleeve element 20 lies substantially in a projection of the frustoconical shoulder 30 of the hollow body member 12. This is a critical feature of the joint arrangement as is the position of the outer junction 58 of the end wall 50, as will be explained later in the specification.

The sleeve element 20 is provided at its outer end with a free edge 60 which is rounded or curved inwardly a slight amount. The purpose of rounding the free edge 60 slightly inwardly assists in the assembly of the plastic pipe in the hollow body member 12 as the interior of the pipe P cannot be scratched or pinched, thus causing local weakness which might precipitate failure after the joint is made up. Additionally, after the joint 10 is made up and the plastic pipe P is loaded externally of the joint 10, the loading on the plastic pipe P might cause the deflection of the same a small amount and by having the edge 60 rounded inwardly, there is so chance of the edge notching the interior wall of the pipe to cause locally higher stresses which also might precipitate failure in time.

The inner and outer frustoconical end walls 48 and 50 respectively, at the extremity of the overall axial extent of the annular recess means 46 of sleeve element 20, each have a slope to the longitudinal axis of the sleeve element in the order of 45° which is the optimum slope to give good pullout resistance to the joint. By making the slope substantially greater than 45°, extrusion of the plastic pipe P occurs in making up of the joint, whereas by making an angle substantially less than 45°, the pullout strength or resistance of the joint 10 is materially reduced.

When the joint 10 is made up, it is desirable that the plastic pipe P does not rotate relative to the sleeve element 20. In order to make the plastic pipe P resist rotation as the joint 10 is being made up, the surface of the recess 46 may be knurled as indicated at K in FIG. 5 or the recess 46 may be provided with one or more longitudinally extending ribs R', as shown in FIG. 6. If the recess 46 in the sleeve element 20 is formed by machining, then the knurling K would be used, whereas if the recess 46 is made by dies, then the flash marks from the dies may be utilized as the ribs R'. Of course, the recess 46 could be coated with a pressure sensitive adhesive, or, for that matter, a grit substance bonded to the surface of the recess at the time of manufacture.

The follower means of member 14, which as previously mentioned is a ring-type follower nut, is provided with the interior threads 62 for a portion of its length and a smooth bore 64 for another portion of its length, the bore terminating in an inwardly depending annular flange 66 having a frustoconical inner surface 68. The diameter of the opening 70 of annular flange 66 is substantially equal to the exterior diameter of the plastic pipe P, so that it can move over the same in a relatively frictionless manner. The frustoconical surface 68 and the surface 64, together with the opposed frustoconical shoulder 30 of body member 12 define therebetween the variable volume compression chamber 16, which is generally trapezoidal in shape in axial section and which is adapted to contain the annular gasket seal 18. The slope of the frustoconical shoulder 30 and the frustoconical surface 68 is generally in the order of 30° with respect to the longitudinal axis of the joint as this angle provides for the smoothest and most uniform deforming of the annular gasket seal 18. Since the interior of the follower nut 14, namely the surface 64, and the frustoconical surface 68 rotate relative to the gasket seal 18, these surfaces are coated with a dry film low friction lubricant, thereby reducing makeup loads or torque when the joint 10 is assembled.

The annular gasket seal 18 in its relaxed configuration is provided with an exterior diameter equal to the interior diameter of the follower nut 14, and with an interior diameter substantially equal to the exterior diameter of the plastic pipe. In axial section, the gasket seal 18 is trapezoidal in shape, so that it is generally complementary to the compression chamber 16 prior to the reduction of volume of the compression chamber 16. Gasket seal 18 is preferably made from an elastomeric material which is noncompressible, but which is deformable under pressure. Rubber and rubberlike substitutes have been found most satisfactory for the gasket seal 18.

As shown in FIG. 1 of the drawings, the joint 10 of the present invention is about to be made up. It will be noted that the plastic pipe P has its end portion positioned in the annular chamber or space between the sleeve element 20 and the second counterbore 36, the plastic pipe P not yet being deformed. Likewise, the annular gasket seal 18 is in its relaxed position substantially filling the compression chamber 16. As the follower nut 14 is threaded onto the body member 12, the compression chamber 16 will reduce in volume. Since the gasket seal 18 cannot compress but only deforms, it will exert a load on the exterior of the plastic pipe in the area of the annular recess 46 forcing the plastic pipe down into this area. As shown in FIG. 2, the joint 10 is completely made up with the follower nut 14 bottoming on the shoulder 24. It is important to note that the frustoconical surface 68 of the follower nut, when the follower nut has bottomed on the shoulder 24, is at a position where a projection of the same is through the outer junction 58 of the frustoconical end wall 50 of annular recess 46 just as is the outer junction 52 of the end wall 48 with respect to the shoulder 30. By such an arrangement, there is proper and positive positioning of the compression chamber 16 relative to the recess 46 and the plastic pipe P is deformed inwardly to entirely fill the recess without any thinning or extruding of the same in the area adjacent the frustoconical end walls 48 and 50 of the annular recess 46. By having the juncture of these end walls contoured each with a radius R, there can be complete filling of the recess 46 and, consequently, when the joint is made up, there will be no cold flow of the plastic pipe into voids which would reduce the load of the gasket seal 18 causing a corresponding reduction in pullout resistance.

Referring to FIG. 8 there is disclosed a fragmentary view of a completed joint according to the present invention, the view showing the joint properly made up so that the gasket seal 18 is providing a uniform load L on the plastic pipe, the load being at right angles to the surface of the plastic pipe, both within the recess and against the frustoconical end walls of the recess. Comparing FIG. 9 to FIG. 8 it will be noted that there is disclosed a joint wherein the positioning of the compression chamber is not fully centered over the recess in the sleeve element or liner as defined above with respect to the final positioning of the frustoconical surface of the follower nut with respect to the outer junction of the outer end wall of the recess. The arrangement of FIG. 9 results in a thinning of the plastic pipe P at the point indicated at 70 which would result in weakening of the pipe in this area and premature joint failure as the joint would not have a pullout resistance equal to or greater than the strength of the pipe.

FIG. 10 is a view of another joint which shows the recess of the sleeve element or liner improperly located in an opposite direction to that of FIG. 9, namely, improperly located with respect to the frustoconical shoulder of the hollow body member. Here again there is thinning or extrusion of the wall of the plastic pipe P but this time in the area indicated at 72, whereas the spacing at the opposite end indicated at 74 is such that there could be possible cold flow of the gasket seal which would measurably reduce the load of the same causing leakage as well as reduced pullout resistance.

FIG. 11 illustrates a joint wherein the location and depth of the recess in the sleeve element is proper but the axial length of such sleeve element is too great with respect to the axial length of the compression chamber. Such an arrangement provides insufficient gasket seal load, especially against the end walls of the recess of the sleeve element, resulting in possible leakage and low pullout resistance. Note the increased areas at 76 and 78 between the end walls of the recess and the respective body member and follower nut thus permitting loss of gasket seal load.

FIG. 12 represents a joint where the annular recess in the sleeve element is of insufficient axial length with respect to the axial length of the compression chamber of the madeup joint, thus causing thinning of the plastic pipe P at 80 and 82 adjacent both ends of the recess. Since thinning or extrusion of the plastic pipe occurs at both ends, it is an indication that the gasket seal loads are too high in this area and thus the joint will have less pullout strength than the plastic pipe P due to weakening of the same within the joint, which is a highly undesirable condition.

FIGS. 13A to 13D inclusive merely represent a sleeve element with a plastic pipe P deformed into the recess of the same. FIG. 13A discloses the sleeve element made according to the present invention having a recess with its frustoconical end wall at substantially a 45° angle with the longitudinal axis of the sleeve element and with the junctures of the end wall contoured each by a radius. It will be noted that in FIG. 13A there is no thinning of the plastic pipe P nor is there any void between the plastic pipe P and the surface of the recess of the sleeve element.

FIG. 13B, on the other hand, discloses a sleeve element substantially similar to the one of FIG. 13A in that the frustoconical end wall is at a substantially 45° angle with the longitudinal axis of the sleeve element. However, in FIG. 13B, the inner and outer junctures are not contoured each by a radius but are provided with sharp edges which will tend to cut the interior of the plastic pipe P as indicated at 84. This will effect premature pipe failure when stressed with a tensile load on the same. Additionally, on assembly of such an arrangement as shown in FIG. 13B, the sharp edges of the junctures produce voids V between the plastic pipe and the inner junctures of the frustoconical end walls and eventually the plastic pipe will flow into these areas, reducing the load of the gasket seal thereon.

The arrangement shown in FIG. 13C provides the sleeve element with an end wall for the annular recess that has too slight an angle with respect to the longitudinal axis. The shallow angle permits readily shaping of the plastic pipe P to the recess on assembly, but it reduces the pullout resistance of the madeup joint.

FIG. 13D discloses an arrangement wherein the end walls of the recess of the sleeve element extend radially of the axis of the same. This type of arrangement provides serious thinning and extrusion of the plastic pipe P on assembly of the joint as well as serious voids V at either end of the recess of the sleeve element allowing for the gradual draining of gasket seal load as the plastic pipe yields into these voids.

While the follower nut 14 is shown in FIG. 2 as bottoming on the hollow body member 12 to provide proper location of the recess of the sleeve element relative to the final configuration of the compression chamber 16 and is preferable, proper location of the compression chamber may also be obtained by providing workmen with reasonable assembly torques for particular joints of particular sizes. If the joint is of the nonbottoming type, it would require slightly more skill on the part of the workmen in assembling the same although, in this particular field, the application of torque to joints is not considered an unusual skill.

Referring now to FIGS. 3 and 4, there is disclosed a modified joint 10' which is substantially similar to the joint of FIGS. 1 and 2 but which can accommodate plastic pipe P varying slightly in outside diameter. In the joint 1' of FIGS. 3 and 4, a semirigid washer 100 L-shaped in axial section and having an inside diameter at least equal to the outside diameter of the pipe P is provided at the outside end of the gasket seal 18 between the same and the frustoconical surface 68 of the follower nut 14. Preferably the semirigid washer is made of a low friction plastic material to reduce makeup loads when the joint is being assembled. As shown in FIG. 4, the semirigid washer 100 distorts when the joint is completely made up and prevents the gasket seal 18 from extruding under the opening through the nut thereby eliminating cold flow of the gasket seal after assembly of the joint. Additionally, the washer 100, when in the position shown in FIG. 4, assists in retaining the pipe P in the joint as any load tending to pull the pipe P out of the joint will cause a pinching of the pipe P by the washer. The inner flange 102 of the washer 100 has a shallow angle to the same, which will permit an oversize pipe to be stabbed into the joint when the joint is being assembled.

Referring now to FIGS. 14 and 15, there is disclosed a still further modification of the joint of the present invention. The joint 10" is shown in FIG. 14 prior to complete makeup of the same, whereas in FIG. 15 the joint 10" is shown fully made up. The body member 12" is somewhat similar to the body member 12 of FIG. 1 in that it has a throughbore 22", a first counterbore 32" extending outwardly from a shoulder 34" and coaxially of the bore 22", and a second counterbore 36" terminating in a shoulder 38" at the outer end of the first counterbore. In this particular embodiment, the first counterbore 32" is interiorly threaded for receiving the exteriorly threaded end 40" of a sleeve element 20".

The sleeve element 20" is provided on its exterior with annular recess means 45", the recess means 45" in the embodiment comprising a pair of axially spaced annular recesses 46". The annular recess means 45" of the sleeve element 20" terminates at the opposite extremities of its overall axial extent in an inner frustoconical end wall 48" and an outer frustoconical end wall 50". The end walls 48" and 50" have the same relationship and function with respect to the variable volume compression chamber 16" when the joint 10" is made up, as do the end walls 48 and 50 of the recess means 45 in the embodiment shown in FIGS. 1 and 2. While the recess means 45″ has been illustrated in the embodiment of FIGS. 14 and 15 as two axially spaced annular recesses or grooves, it will be appreciated by those skilled in the art that it may be a single recess or groove, as shown in FIGS. 1 and 2.

The joint 10″ has a "packing gland" type follower means 14″, as opposed to the ring nut type follower means of the joint shown in FIG. 1. In this respect, the body member 12″ is provided with a frustoconical shoulder 30″ at the outer end of the second counterbore 36″. The frustoconical shoulder 30″ faces outwardly and flares outwardly and provides an outwardly facing wall at the end of a third counterbore 37 in the body member 12″. The counterbore 37 is partially interiorly threaded, as indicated at 39.

Referring back to the follower means 14″, it will be noted the same includes a nut exteriorly threaded at 41 for reception in the threads 39, the nut having a shoulder 43 for bottoming against the end of the body member 12″. The end portion of the nut 14″ is preferably provided with frustoconical face 47 for engaging a metallic antifriction ring 49. The ring 49 is coated with a dry film antifriction lubricant so that there will be low friction between it and the nut, the body and the gasket seal 18″. The ring 49 has a complementary frustoconical surface 51 for mating with the surface 47 of the nut, whereas the other side of the same is also provided with a frustoconical surface 53 which opposes the frustoconical shoulder 30″ to define the compression chamber 16″ for the gasket seal 18″.

The operation and functioning of the joint 10″ is substantially identical to the joints previously described with respect to FIGS. 1—4 inclusive. It might be pointed out that in the embodiment shown in FIGS. 14 and 15, the "packing gland" type of joint does have an advantage over the joints previously described, in that the gland nut 14″ provides a substantially longer leak path between the body member and gasket. Also, the gasket is retained within the body member, rather than within the nut, and thus, the joint is particularly adaptable on pipes P having larger outside diameters. An additional advantage of this joint is that it reduces the contact area between the rotating nut and the gasket seal when the joint is being made up. Consequently, the torque necessary for makeup is reduced and the tendency to twist the gasket seal is reduced.

Referring to FIG. 16, there is disclosed a further modification of the present invention. In the joint 10‴ of FIG. 16, it will be noted that the body member 12‴ is provided with a third counterbore 37‴, but that a portion of this counterbore is not interiorly threaded. In this respect, the end portion of the body member 12‴ is exteriorly threaded, as indicated at 39‴, for receiving a ring-type nut 14‴, which urges the antifriction ring 51‴ against the gasket seal 16‴. The arrangement shown in FIG. 16 is a combination of the joint of FIG. 1 and the joint of FIG. 14 and it functions as a gland nut type of joint, rather than a straight coupling nut joint.

The terminology used throughout this specification is for the purpose of description and encompasses all of the modifications of the invention within the spirit and scope of the following claims.

What I claim is:

1. An improvement in a joint for connecting a plastic pipe to fittings or metal pipes comprising: a hollow body member having an end portion, said body member having a bore extending at least through said end portion, a first counterbore terminating at its inner end in an inwardly extending annular shoulder surrounding said bore and terminating at its outer end in an outwardly extending annular shoulder, a second counterbore of a diameter greater than the diameter of said first counterbore and substantially equal to the outside diameter of the plastic pipe, said second counterbore extending outwardly from the annular shoulder of the outer end of said first counterbore and terminating in an outwardly facing and flaring frustoconical shoulder; an elongated rigid tubular sleeve element having one end portion fixedly secured in said first counterbore against axial movement relative said body member and the other end projecting substantially beyond the frustoconical shoulder of said body member, said tubular sleeve element having an exterior diameter substantially equal to the interior diameter of the pipe at least on the portion of the same received in the pipe and said tubular sleeve element having, on the exterior surface of the portion projecting beyond the frustoconical shoulder, an annular recess means of a substantial overall axial extent and uniform depth, said annular recess means terminating in oppositely disposed frustoconical inner and outer end walls at its overall axial extent, the outer juncture of said inner frustoconical end wall lying substantially in a projection of said frustoconical shoulder of said body member, the exterior surface of said sleeve element between the fixedly secured end of the same and the outer juncture of said inner frustoconical end wall defining with said second counterbore an annular chamber of substantial axial extent for snugly receiving an end portion of the plastic pipe; follower means including a nut threadedly received by said body member, said follower means having an inner diameter at least equal to the exterior diameter of the plastic pipe and a frustoconical inner surface opposed to and spaced from said frustoconical shoulder of said body member to define therebetween a variable volume annular compression chamber having an initial axial length greater than the overall axial extent of said annular recess means on said sleeve element; a noncompressible annular gasket seal made of a deformable material and having an axial cross section when relaxed generally complementary to said compression chamber prior to volume of the compression chamber being reduced and an axial extent greater than the axial extent of said annular recess means on said sleeve element; and means for limiting and tightening of said nut on said body member to a position where the frustoconical inner surface of said follower means reduces the volume of said compression chamber and where a projection of said frustoconical inner surface of said follower means extends through the outer junction of said outer frustoconical end wall of the said annular recess means on said sleeve element so that said gasket seal deforms the plastic pipe without extrusion into said annular recess to completely fill the same.

2. A joint as claimed in claim 1 in which said means for limiting tightening of the nut on said body member includes a shoulder on said body member on which said nut bottoms.

3. A joint as claimed in claim 1 in which said inner and outer frustoconical end walls of the annular recess means of said sleeve element have an angle in the order of 45° relative to a longitudinal axis of said sleeve element.

4. A joint as claimed in claim 1 in which said frustoconical shoulder of said body member and said frustoconical surface of said follower means each has an angle to the longitudinal axis of the joint in the order of 30°.

5. A joint as claimed in claim 1 in which the annular recess means of said sleeve element has a surface with means thereon for gripping the interior of the plastic pipe when said nut is tightened on said body member to thereby resist relative rotation between said plastic pipe and said sleeve element as said plastic pipe is being deformed.

6. A joint as claimed in claim 5 in which said means to resist relative rotation between said sleeve element and said plastic pipe includes at least one longitudinally extending rib projecting outwardly from the surface of said annular recess.

7. A joint as claimed in claim 5 in which said means to resist relative rotation between said sleeve element and the plastic pipe includes knurling on the surface of said recess.

8. A joint as claimed in claim 1 in a dry film low friction lubricant coated on its interior surface to thereby reduce friction between the follower means and said gasket seal when a joint is made up.

9. A joint as claimed in claim 1 including a semirigid washer substantially L-shaped in radial section and positioned between said frustoconical surface of said follower nut and said gasket seal, said washer being distorted by said frustoconical surface upon makeup of the joint to prevent cold flow of said gasket seal from beneath the annular flange of said follower nut.

10. A joint as claimed in claim 9 in which said semirigid washer is made of a low friction plastic material.

11. A joint as claimed in claim 1 in which the outer end of said sleeve element is slightly rounded inwardly, whereby a free edge of said sleeve element is spaced from the interior of the plastic pipe.

12. A coupling joint as claimed in claim 1 in which said sleeve element is fixedly secured by a press fit in sad first counterbore.

13. A joint as claimed in claim 1 in which said sleeve element is fixedly secured by threading the same in said first counterbore.

14. A joint as claimed in claim 1, in which said annular recess means which said follower means has a at least two axially spaced annular recesses on the exterior of said tubular sleeve element.

15. A joint as claimed in claim 1, in which the depth of said annular recess means is in the order of one thirty-second of an inch.

16. A joint as claimed in claim 1, in which said nut of said follower means is a gland nut and in which said frustoconical inner surface of said follower means is on an antifriction ring arranged to be urged axially of the pipe against the gasket seal by said nut.

17. A joint as claimed in claim 16 in which said body member includes a third counterbore extending outwardly from the outwardly facing and flaring frustoconical shoulder, at least a portion of said third counterbore defining with said last mentioned shoulder and with said antifriction ring the variable compression chamber for said gasket seal.

18. A joint as claimed in claim 17, in which the outer end portion of said third counterbore is interiorly threaded and said nut is exteriorly threaded.

19. A joint as claimed in claim 17, in which said nut is interiorly threaded and in which the end portion of said body member is exteriorly threaded.

20. A joint as claimed in claim 16, in which said antifriction ring is coated with a dry film antifriction lubricant material.

21. A joint as claimed in claim 1 in which each inner and outer end wall of said annular recess means has a radius at its outer and inner junctures.